INVENTORS
ERWIN A. SCHUMACHER
GEORGE W. HEISE

Patented Sept. 19, 1944

2,358,419

UNITED STATES PATENT OFFICE 2,358,419

ELECTRODE FOR USE IN ELECTROLYTIC PROCESSES

Erwin A. Schumacher, Parma, and George W. Heise, Rocky River, Ohio, assignors to National Carbon Company, Inc., a corporation of New York Application July 25, 1942, Serial No. 452,290

7 Claims. (Cl. 204—290)

The invention relates to porous electrodes for use in electrolytic processes. Such porous electrodes may be composed of various materials, such as carbonaceous material or metal (for example copper), or they may be composed of porous ceramic material coated with metal.

Our Patent 2,273,795, issued February 17, 1942, describes novel carbonaceous electrodes and their use in various electrolytic processes. The electrodes there described are composed of a porous carbon as described in Patent 1,988,478, B. E. Broadwell, et al., characterized by a large number of minute interconnecting channels leading from the surface, each channel having a length at least several times its diameter. The processes described in our patent include electrolytic oxidation and reduction processes (both organic and inorganic) and the electrodeposition of metals. A feature of some of these processes is that electrolyte is withdrawn through one or more of the porous carbon electrodes mentioned. For example, mixing of the anolyte and catholyte may be prevented by withdrawal through such electrodes of either anolyte or catholyte or both.

We have found in some cases, particularly when the electrolyte is hot and the rate of withdrawal of electrolyte is not great, that there is back diffusion of the reaction products of electrolytic processes. Sometimes such back diffusion has no serious consequences; but in other situations it lowers the efficiency of the cell to an important degree. Although porous diaphragms may be used to reduce back diffusion, the use of diaphragms is generally objectionable and increases the internal electrical resistance of the cell.

It is an object of the present invention to provide improved means for preventing back diffusion of reaction products withdrawn through a porous electrode, and a further object is to provide means for the prevention of diffusion of products of electrolytic processes which is free from the disadvantages of the diaphragms commonly used in electrolytic operations.

Figure 1:
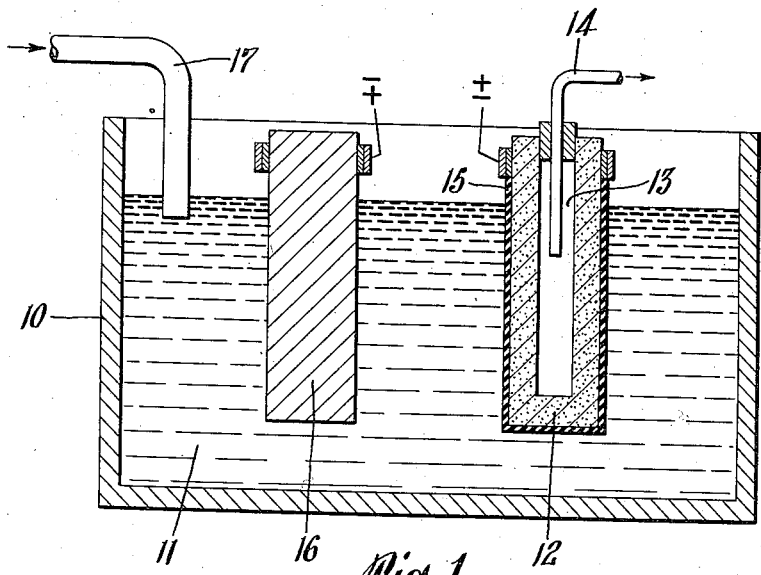
Figure 2:
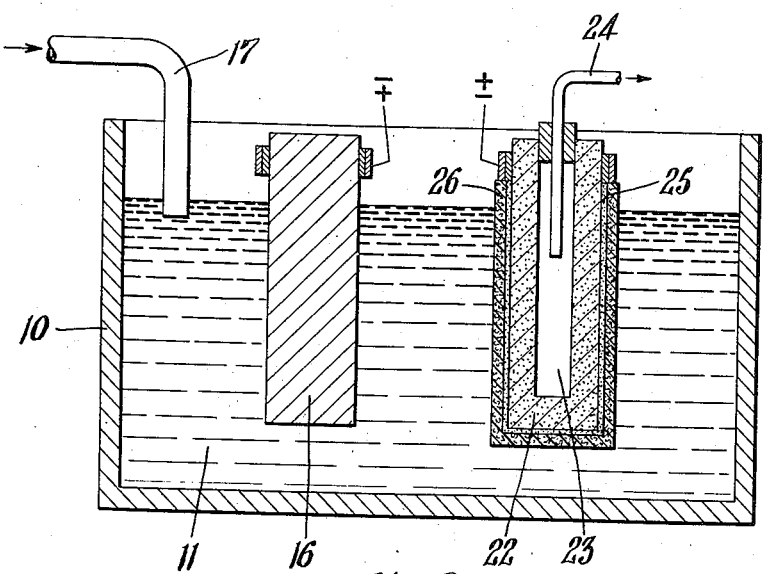

These and other objects are achieved by the invention which is based on our discovery that a thin, electrically insulating porous layer of inert material supported by, or mounted on a porous electrode considerably decreases back diffusion of reaction products withdrawn through the electrode and correspondingly increases the efficiency of the cell. The invention will be described with reference to the accompanying drawing, in which:

Fig. 1 represents diagrammatically in vertical cross-section an electrolytic cell container containing an electrolyte, a porous electrode having a surface layer of inert material integral with it, and a nonporous electrode; and Fig. 2 represents diagrammatically in vertical cross-section an electrolytic cell similar to that shown in Fig. 1 but containing a porous electrode having a surface layer of inert material cemented thereto.

The invention comprises an electrode for use in an electrolytic cell containing a body of electrolyte, said electrode being porous and having on its surface portions, integral therewith, a thin, porous film, or coating, of inert material. Materials which may be used for this thin, porous coating include rubber or other film-forming plastic, the various common forms of fibrous cellulose, asbestos, and diatomaceous earth. Where necessary suitable bonding agents such as silicate cements, synthetic resins, for example, resins resulting from the conjoint polymerization of a vinyl halide and a vinyl ester of a lower aliphatic acid, or resins such as phenol aldehyde condensation products, or tar or pitch either baked or unbaked may be used.

Preferably, a dilute solution of rubber, for instance in benzene, is employed. A rubber cement containing about 15% to 16% rubber may suitably be used, about 15 to 30 volumes of the cement being diluted to about 100 volumes with benzene, for example. This solution is applied directly by spraying or by dipping, to a porous electrode which may be warm enough to volatilize at least a portion of the solvent to prevent undue penetration of the solution into the electrode. The residual solvent may be volatilized by heating, leaving a thin, porous film or membrane of rubber on the electrode and integral therewith.

The surface coating of inert material formed on an electrode in accordance with the invention, being integral with the surface of the electrode, electrically insulates it. Since the coating is porous, however, it permits the electrolyte to penetrate the long capillary passages, or pores, of the electrode. It is in these passages that the desired electrolytic action takes place, the coating thereby causing electrolytic action to take place within the pores of the electrode rather than at its surface. Because of the withdrawal of electrolyte through the electrode, the velocity of the moving electrolyte in the capillary passages is so high as to prevent to a large extent the back diffusion of the electrolyte which occurs when the reaction takes place at the surface of the electrode where the velocity of the electrolyte is low. Although the porous membrane formed on an electrode in accordance with the invention is much thinner than an ordinary diaphragm, it is effective in achieving the above-described objects of the invention. Because of its thinness, it adds very little resistance to the flow of electricity or the flow of electrolyte. Rubber membranes may contain as little as 0.5 to 5 grams of rubber per square foot of surface.

Referring to Fig. 1 of the drawing, in accordance with the invention an electrolyte 11 may be introduced into a cell container 10 through a conduit 17 and subjected to the action of an electric current between a porous electrode 12 and a non-porous electrode 16. Electrolyte is withdrawn from the cell through a conduit 14 extending into a well 13 provided in the electrode 12, and back diffusion of the electrolyte through the electrode 12 is prevented by a layer 15 of an inert, porous, film-forming plastic material integral with the electrode 12. Or, as shown in Fig. 2, a porous electrode 22 is provided with a surface layer 26 of inert material, such as fibrous cellulose or asbestos, bonded to the porous electrode 22 by a bond 25 of cement. In both Fig. 1 and Fig. 2 the thickness of the electrode coating is exaggerated.

In tests of cells containing electrodes having a porous rubber membrane formed thereon by the above method, it was found that the current efficiency of the cells was substantially improved without greatly increasing the cell voltage. For example, in the electrolysis of a hot aqueous solution of ferrous chloride, as described for instance in our Patent No. 2,273,036, issued February 17, 1942, in which iron was deposited at the cathode and ferrous chloride oxidized to ferric chloride at the anode, the ferric chloride being withdrawn through a porous carbon anode provided with a surface coating as described above, a current efficiency of 92% to 98% was obtained at the anode, and the cathode current efficiency was 85% to 89%. Tests made with similar electrodes having no surface layer gave anode current efficiencies of 45% to 70% and cathode current efficiencies of 65% to 75%. Cell voltage required with the electrodes having the film of the invention was 1.85 to 2.05, and the cell voltage required with the untreated electrodes was 1.75 to 1.85, with current densities of 30 to 40 amperes per square foot.

While particular emphasis has been laid in the foregoing description on the use of the porous film of the invention in connection with porous carbonaceous electrodes, it is equally applicable to use with other types of porous electrodes in which the length of the pore passages is at least several times their diameter. Further, the invention is useful in the electrolysis of fused salts and organic solutions as well as in the electrolysis of aqueous electrolytes. It will also find application in processes in which no current is supplied from an external source.

This application is in part a continuation of our copending application Serial No. 284,452, filed July 14, 1939.

We claim:

1. In an electrolytic cell through which an impressed electric current is passed, such cell comprising at least one porous electrode composed of porous material having a large number of minute interconnecting channels leading away from the surface, each channel having a length at least several times its diameter, said electrode being immersed in an electrolyte and provided with means for withdrawing electrolyte through such electrode, the improved means for preventing back diffusion of electrolyte which comprises a thin electrolyte-pervious coating of electrically insulating inert material integral with the surface portions of said porous electrode, said coating acting during use of the cell to electrically insulate the surface portions of the porous electrode while permitting electrolyte to penetrate the said interconnecting channels leading away from the electrode surface and thereby to force electrolytic action to take place only within said channels.

2. In an electrolytic cell containing an aqueous electrolyte, at least one porous carbon electrode immersed therein, and means for withdrawing electrolyte through such porous electrode, said carbon having a large number of minute interconnecting channels, each at least several times as long as its diameter, leading away from the surface, the improved means for decreasing back diffusion of products of electrolysis which comprises an electrolyte-pervious film of electrically insulating inert material integral with the surface portions of said electrode, said film being so thin as not materially to hinder withdrawal of electrolyte through said electrode but acting to decrease materially said back diffusion by electrically insulating the surface of said electrode while permitting electrolyte to penetrate said channels and thereby forcing electrolytic action to take place only within said channels.

3. The improvement as claimed in claim 2, wherein the said film is composed of rubber.

4. The improvement as claimed in claim 2, wherein the said film is composed of siliceous material and a bonding agent.

5. The improvement as claimed in claim 2, wherein the said film is composed of fibrous cellulose and a bonding agent.

6. A porous electrode for use in electrolytic processes wherein it is immersed in an electrolyte, said electrode being composed of a porous material having a large number of minute interconnecting channels each having a length several times its diameter and leading away from the surface, and for preventing back diffusion of the products of electrolysis, means for withdrawing electrolyte through said channels and a thin, electrolyte-pervious coating of electrically insulating inert material integral with the surface portions of said electrode, said coating acting during use of said electrode to electrically insulate its surface portions while permitting electrolyte to penetrate said channels and thereby to force electrolytic action to take place in said channels.

7. A porous carbon electrode for use in electrolytic processes wherein it is immersed in an electrolyte, said carbon having a large number of minute interconnecting channels each having a length several times its diameter and leading away from the surface, and for preventing back diffusion of the products of electrolysis, means for withdrawing electrolyte through said channels and a thin, electrolyte-pervious coating of rubber integral with the surface portions of said electrode, said coating acting during use of said electrode to electrically insulate its surface portions while permitting electrolyte to penetrate said channels and thereby to force electrolytic action to take place in said channels.

ERWIN A. SCHUMACHER.
GEORGE W. HEISE.